C. B. FOWLER.
FENDER.
APPLICATION FILED FEB. 5, 1921.
1,410,399.
Patented Mar. 21, 1922.
2 SHEETS—SHEET 1.
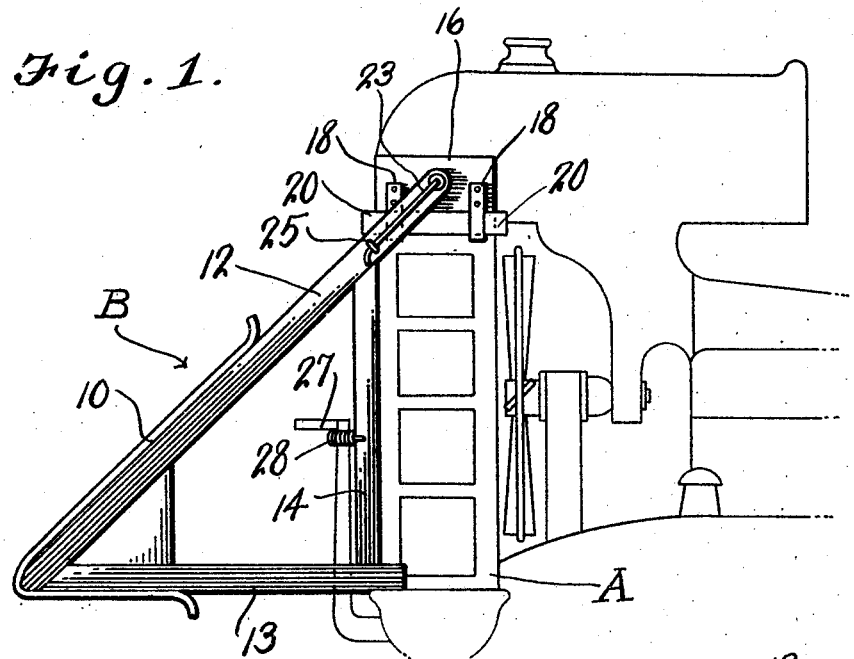
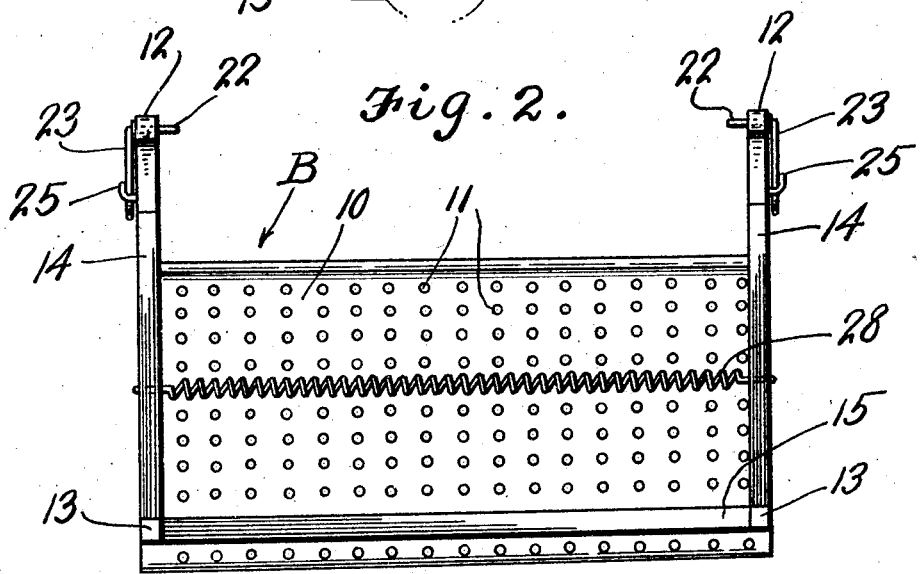
WITNESS:
L. B. James
E. Geager
C. B. Fowler   INVENTOR
BY Victor J. Evans
ATTORNEY C. B. FOWLER.
FENDER.
APPLICATION FILED FEB. 5, 1921.
1,410,399.
Patented Mar. 21, 1922.
2 SHEETS—SHEET 2.
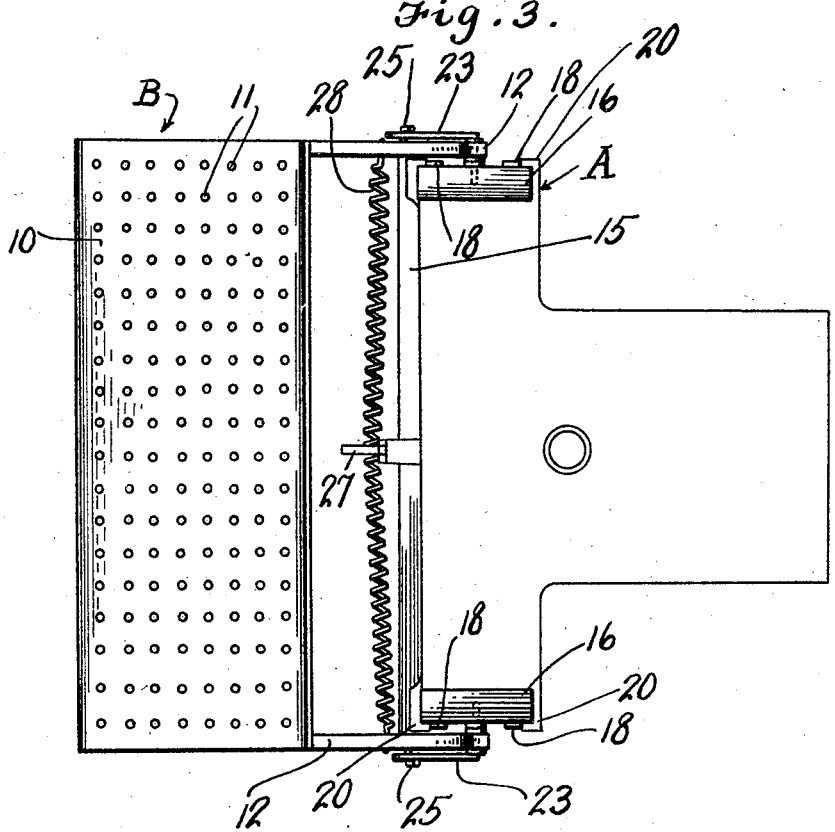
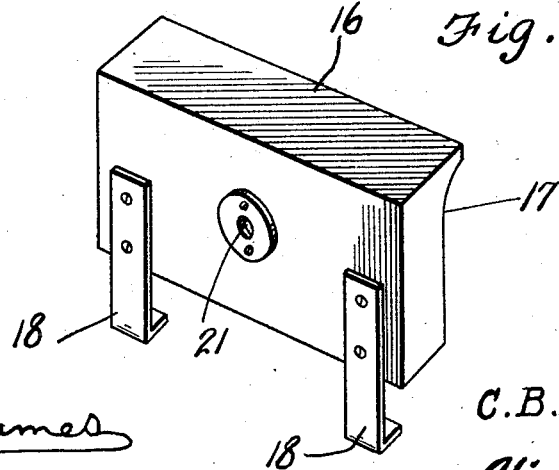
WITNESS:
C. B. Fowler
INVENTOR
BY Victor J. Evans
ATTORNEY

UNITED STATES PATENT OFFICE.

COURTNEY B. FOWLER, OF PETERSBURG, INDIANA.

FENDER.

1,410,399.  Specification of Letters Patent.  Patented Mar. 21, 1922.

Application filed February 5, 1921. Serial No. 442,725.

*To all whom it may concern:*

Be it known that I, COURTNEY B. FOWLER, a citizen of the United States, residing at Petersburg, in the county of Pike and State of Indiana, have invented new and useful Improvements in Fenders, of which the following is a specification.

This invention comprehends the provision of a fender for tractor radiators, and while it is primarily intended for use with the Fordson tractor, its general application is contemplated by the claims.

The chief characteristic of the invention resides in the provision of a fender to protect the radiator from injury by contacting leaning corn stalks, jagged or broken limbs and the like, and to prevent the air passages from being clogged with leaves, weeds and the like while the tractor is in operation.

An object of the invention resides in the provision of a fender of the above mentioned character which can be quickly and easily attached to the radiator or removed therefrom when desired, the means for associating the fender with the radiator allowing the fender vertical swinging movement, so that the fender can be elevated to permit cranking of the tractor or the filling of the radiator with water when necessary.

In carrying out the invention I construct the fender so that the cranking handle of the tractor is utilized to assist in holding the fender against swinging movement when the latter is in position for use.

The invention embodies the desired features of simplicity, and durability, and can be manufactured and sold at a nominal cost.

The nature and advantages of this invention will be better understood when the following detail description is read in connection with the accompanying drawings which form part of this application.

In the drawings forming part of this application like numerals of reference indicate the similar parts in the several views and wherein:—

Figure 1 is a side elevation of the invention showing the same associated with a radiator of a tractor.

Figure 2 is a fragmentary view in elevation.

Figure 3 is a top plan view.

Figure 4 is a detail plan view of one of the supporting elements adapted for association with the radiator.

Referring to the drawings in detail A indicates the radiator of a tractor of well-known construction, the fender for such radiator being indicated generally at B.

The fender comprises opposed side members of substantially V-shaped formation and support the body portion 10 of the fender as shown. In this particular instance the body of the fender consists of a sheet of metal or other suitable material perforated as at 11, but the body portion of the fender may be made up of spaced parallel bars or any other construction found suitable for the purpose. The limbs 12 and 13 of the respective side members are connected by uprights 14, while the corresponding limbs 13 of these members are connected by transverse member 15. The construction of the fender is such that when it is associated with the radiator it projects downwardly and outwardly therefrom as illustrated in Figure 1. The component parts of the fender may be constructed from any suitable material, and the fender may also vary in size without departing from the spirit of the invention.

Any suitable means may be employed for attaching the fender to the radiator, as shown in this specification instant use is made of a pair of blocks 16, the blocks being arranged at the opposite sides of the radiator and having one side slightly curved as at 17 to conform to the curvature of the radiator. Secured to one side of each block is a hook like element 18 which projects beneath the lower edge thereof, the hook terminals being extended inwardly to engage the under side of the projections 20 of the radiator. The hook-like elements or brackets 18 are so arranged with the projections or corners 20 of the radiator that they can only be associated with the latter or removed therefrom in a sideward direction, this construction being illustrated in Figure 3. Each block is provided with a center opening 21 to receive the offset extremities 22 of a resilient arm 23 carried by one of the adjacent limbs 12 of the frame of the fender.

When the offset extremities 22 of the above mentioned arms are positioned within the openings 21 of the blocks the latter are held firmly associated with the radiator to support the fender thereon, the offset extremities 22 constituting pivots upon which the fender can be swung upwardly to a position above the radiator to gain access to the filling tube of the radiator. Each limb 12 of the fender frame carries a hook 25 into which the arm 22 is adapted to be sprung subsequent to the association of the fender with the blocks 16 in the manner above described.

When the fender is positioned upon the radiator the crank 27 of the tractor is arranged vertically passing beneath and in advance of the transverse member 15 of the fender, and is utilized to assist in preventing the fender in its entirety from being raised when meeting stalks or the like or in fact any condition. In order to hold the crank 27 in this position I make use of a coiled spring 28 which connects the uprights 14, the spring being disposed thereagainst as clearly shown. When it is desired to raise the fender, it is only necessary to move the spring 28 away from the crank 27, allowing the latter to assume a position to permit the fender to be raised as described. When the fender is positioned upon the radiator for use it requires no further attention and is designed to effectively protect the radiator from injuries by obstacles in its path of movement, as well as to prevent the air passages from getting clogged by weeds or the like.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim is:—

1. A tractor radiator fender comprising spaced elements arranged at the opposite sides of the radiator and designed to engage the projecting portions thereof, a protecting member, means for associating the protecting member with said elements whereby the latter are held firmly positioned upon the radiator, and said means providing for pivotal movement of said member, and means for holding said member fixed relatively to the radiator in position for use.

2. A tractor radiator fender comprising a protecting member pivotally mounted upon the radiator for vertically swinging movement, a transverse member carried by the protecting member and arranged to be engaged by the crank of the tractor when the latter is in an upright position whereby the crank serves to hold the protecting member against upward movement with relation to the radiator, and means carried by the protecting member to engage the crank to hold the latter in said upright position.

3. A tractor radiator fender comprising a protecting member pivotally mounted upon the radiator for vertical swinging movement, and means including the crank of the tractor for holding said member against said movement when in position for use.

4. A tractor radiator fender comprising spaced elements and adapted to be arranged at opposite sides of the radiator and designed to engage the projections thereon, each of said elements having an opening, a projecting member including a frame having its upper ends arranged adjacent said elements, resilient arms carried by said upper ends of the frame and having offset portions projecting within the openings of said elements, and hook like members carried by the frame to engage the arms to hold the latter in an active position, whereby the said elements are fully supported upon the radiator for the purpose specified.

In testimony whereof I affix my signature.

COURTNEY B. FOWLER.